United States Patent
Morris et al.

(10) Patent No.: US 12,160,080 B2
(45) Date of Patent: Dec. 3, 2024

(54) EXCIMER LASER SYSTEM WITH LONG SERVICE INTERVALS

(71) Applicant: STRATA SKIN SCIENCES, INC., Horsham, PA (US)

(72) Inventors: James Morris, Oceanside, CA (US); David Brooks, Oceanside, CA (US); Shmuel Gov, Carlsbad, CA (US)

(73) Assignee: STRATA SKIN SCIENCES, INC., Horsham, PA (US)

( * ) Notice: Subject to any disclaimer, the term of this patent is extended or adjusted under 35 U.S.C. 154(b) by 695 days.

(21) Appl. No.: 17/424,433

(22) PCT Filed: Jan. 7, 2020

(86) PCT No.: PCT/US2020/012596
§ 371 (c)(1),
(2) Date: Jul. 20, 2021

(87) PCT Pub. No.: WO2020/146398
PCT Pub. Date: Jul. 16, 2020

(65) Prior Publication Data
US 2022/0094133 A1     Mar. 24, 2022

(51) Int. Cl.
| | |
|---|---|
| H01S 3/036 | (2006.01) |
| H01S 3/104 | (2006.01) |
| H01S 3/134 | (2006.01) |
| H01S 3/225 | (2006.01) |

(52) U.S. Cl.
CPC .............. *H01S 3/134* (2013.01); *H01S 3/036* (2013.01); *H01S 3/104* (2013.01); *H01S 3/225* (2013.01)

(58) Field of Classification Search
CPC . H01S 3/134; H01S 3/03; H01S 3/036; H01S 3/225
See application file for complete search history.

(56) References Cited

U.S. PATENT DOCUMENTS 6,151,349 A * 11/2000 Gong ...................... H01S 3/225
372/59
2010/0142582 A1* 6/2010 Sandstrom .............. H01S 3/036
372/61

* cited by examiner

*Primary Examiner* — Tod T Van Roy
*Assistant Examiner* — Delma R Forde
(74) *Attorney, Agent, or Firm* — Gottlieb, Rackman & Reisman, PC

(57) ABSTRACT

An excimer laser system includes first and second gas cylinders connected to a laser chamber for selectively supplying the laser chamber with gases that are needed to generate and emit laser pulsations having a certain energy level from the laser chamber. At least one of the first and second gas cylinders includes a halogen gas. The halogen gas is consumed during the operation of the excimer laser system. A computer system, included within the excimer laser system, is used to determine whether to resupply the laser chamber with halogen gas from the first and/or second cylinders, or to entirely flush out the gas contents of the laser chamber, and to resupply the flushed gas chamber with gas sourced from the first and/or second cylinders.

23 Claims, 3 Drawing Sheets

EXCIMER LASER SYSTEM WITH LONG SERVICE INTERVALS

CROSS-REFERENCE TO RELATED APPLICATION(S)

This application claims priority to U.S. Provisional Patent Application No. 62/789,213, filed on Jan. 7, 2019, the disclosure of which is incorporated by reference herein in its entirety.

TECHNICAL FIELD

The present invention relates to an excimer laser system, and more particularly, to an excimer laser system having dual gas cylinders and a computer control system to selectively replenish gases within the laser chamber and providing long service intervals.

DISCUSSION OF THE RELATED ART

Excimer lasers have a variety of uses. In medical applications, excimer lasers are used to treat mild to moderate psoriasis and in ophthalmology to reshape the cornea. A typical excimer laser chambers requires an inert gas such as xenon (Xe), a halogen or halogen donor such as hydrogen chloride (HCl), and an inert buffer gas such as neon (Ne) in order for a repetitively pulsed gas discharge to form the active excited-state dimer (excimer) such as xenon monochloride (XeCl). The excimer molecule typically has a very short lifetime and will split apart spontaneously or will be stimulated to split apart, thereby generating ultraviolet (UV) photons. These UV photons are captured within an optical resonator and will multiply until emitted as UV laser pulses through the output coupler of the resonator.

The inert gases within the excimer laser chamber are non-reactive and will reside inside the chamber indefinitely. However, the halogen or halogen donor are consumed through a chemical reaction that occurs both when the laser is operating and when it is idle. The chemical reaction is primarily with the metal surfaces in the excimer laser chamber such as nickel (Ni), and the reaction products are low vapor pressure metal halides, such as nickel chloride. The halogen or halogen donor can also react with other materials within the excimer laser chamber such as carbon, producing known excimer contaminates such as high vapor pressure chlorocarbons.

These reactions reduce the quantity of halogen or halogen donor available for the laser generation to a less than optimal value and can reduce the laser generation efficiency. As a result, the laser gas within the chamber needs to be replaced periodically in order to compensate for the lost halogen or halogen donor and to flush out any gas-phase contamination. The periodic replacement of the gas in the gas chamber quickly depletes the gas cylinder used to source the gas. When depleted, the gas cylinder must be replaced by a qualified technician in order to maintain the excimer laser system in operation. The cost of dispatching a technician to the location of the excimer laser system is high, and that cost is typically borne by the party requesting maintenance.

SUMMARY OF THE INVENTION

The present invention relates to an excimer laser system with long service intervals. The excimer laser system of the present invention includes, inter alia, first and second gas cylinders that supply gases to the gas chamber. In different embodiments, the first and second gas cylinders may contain different gases, different gas mixture ratios, and/or gas at different pressure levels. The excimer laser system also includes a computer controlled piping (or plumbing) network for selectively transporting gas from the first and second cylinders into the gas chamber.

Consumption of the halogen or halogen donor gas in the gas chamber is monitored by the excimer laser system, for example, by measuring the intensity of the generated UV laser beam. When the excimer laser system determines that the halogen or halogen donor must be replenished in the gas chamber, the excimer laser system uses the computer controlled piping network to source the halogen or halogen donor gas from the first and/or second gas cylinders. In addition, when the amount of contaminants in the gas chamber builds up to a certain level, the computer controlled piping network may be used to flush out the gases together with the contaminants from the gas chamber, and then to replenish the gases in the gas chamber to the appropriate levels by sourcing gas from the first and/or second cylinders. The computer control system monitors system operation to determine when to replenish the halogen or halogen donor, or to refill the gas chamber with all of the gases that are needed after the flushing operation, as the case may be, to the optimal level such that the gas chamber can be used to produce UV light at an optimal (or peak) intensity.

Using the first and second gas cylinders with different gas mixture ratios, and/or different gas pressure levels contained in the first and second cylinders in combination with the physical configuration and operation method of the computer controlled gas piping network to selectively replenish or purge and replenish the gases in the laser chamber improves system efficiency and allows the excimer laser system of the present invention to be operated without the need to replace either the first and second cylinders for a significantly longer period of time than the time over which a conventional excimer laser system can operate by operating the conventional excimer laser system with a single gas cylinder until the gas cylinder becomes fully depleted, replacing the depleted gas cylinder with a new (full) gas cylinder, and then operating the conventional excimer laser system again until the second gas cylinder becomes fully depleted as well.

In other words, the excimer laser system of the present invention can be operated without any maintenance (to replace the gas cylinders) for much longer than double the time which a conventional excimer laser system can be operated and, in some configurations, may operate without any gas replacement required over the expected operating lifetime of the laser. As a result, the high maintenance cost associated with dispatching a technician to periodically replace a depleted gas cylinder is reduced or eliminated.

In fact, in some instances the first and second gas cylinders can last the entire lifetime of the excimer laser system, allowing the excimer laser system of the present invention to be operated with virtually no maintenance costs, and without the down time associated with the depletion of a gas cylinder.

BRIEF DESCRIPTION OF THE DRAWINGS

The above and other features of the present invention will become more apparent by describing in detail exemplary embodiments thereof in conjunction with the accompanying drawings, in which.

DETAILED DESCRIPTION OF THE EMBODIMENTS

Figure 1:
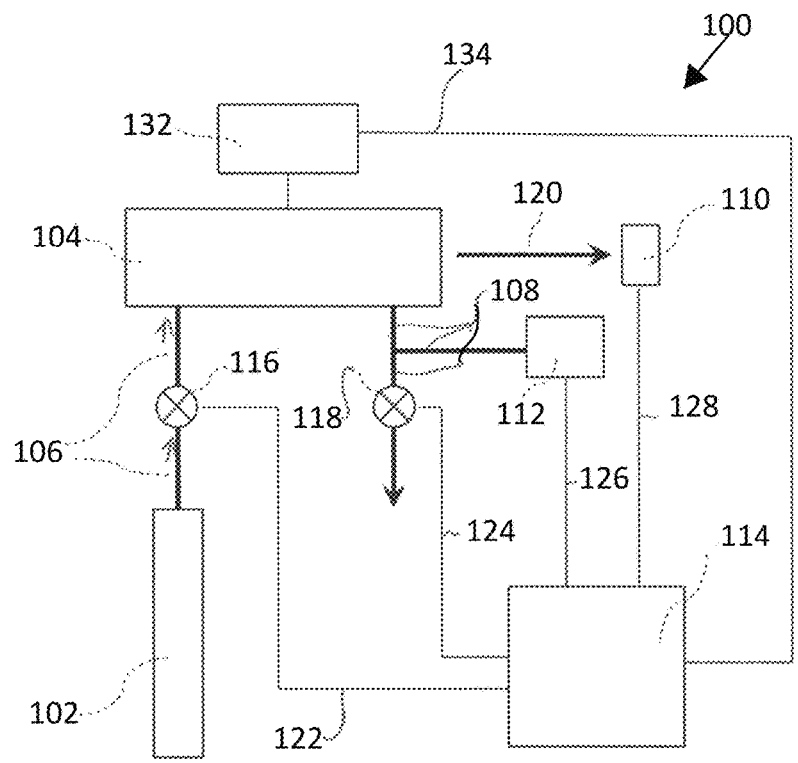
FIG. 1 is a schematic diagram illustrating a single cylinder excimer laser system.

Exemplary embodiments of the present invention will be described more fully hereinafter with reference to the accompanying drawings. The present invention may, however, be embodied in different forms and should not be construed as being limited to the embodiments set forth herein. Like reference numerals may refer to like elements throughout the specification. The sizes and/or proportions of the elements illustrated in the drawings may be exaggerated for clarity.

When an element is referred to as being connected to another element, intervening elements may be disposed therebetween. In addition, elements, components, parts, etc., not described in detail with respect to a certain figure or embodiment may be assumed to be similar to or the same as corresponding elements, components, parts, etc., described in other parts of the specification.

FIG. 1 is a diagram illustrating an excimer laser system 100 with a single gas cylinder. The excimer laser system 100 includes a gas cylinder 102, a laser chamber 104, a first gas manifold 106, a second gas manifold 108, a laser energy detector 110, a pressure transducer 112, a computer system 114 and a high voltage pulser 132.

The gas cylinder 102 may include a mixture of gases which can enable the generation of a UV laser when the high voltage pulser 132 is operated in order to emit the laser beam 120 in pulses having a certain energy level.

The first gas manifold 106 connects the gas cylinder 102 to the laser chamber 104 such that the gas contained in the gas cylinder 102 can be injected into the laser chamber 104 when needed. The first gas manifold 106 includes a first valve 116, which is normally closed. The first valve 116 may be, for example, a solenoid valve.

The second gas manifold 108 connects the laser chamber 104 to the pressure transducer 112 and to the outside (e.g., to the ambient outside of the laser chamber 104). The pressure transducer 112 is configured to monitor the pressure inside of the laser chamber 104 via the second gas manifold 108. The second gas manifold 108 may include a second valve 118 used to vent the laser chamber.

The laser chamber 104 is configured to emit laser beam pulsations by operating the high voltage pulser 132. The laser energy detector 110 can be used to measure the energy of the laser beam pulsations 120.

The computer system 114 is electrically connected to the first valve 116 through a first connection line 122, to the second valve 118 through a second connection line 124, to the pressure transducer 112 through a third connection line 126, to the laser energy detector 110 through a fourth connection line 128, and to the high voltage pulser 132 through a fifth connection line 134.

The computer system controls the operation of the high voltage pulser 132 in order to generate the laser beam pulsations 120. When the computer system 114 determines through input data received from the laser energy detector 110 that the energy of the laser beam pulsations 120 is low—which can be due to the presence of a low quantity of halogen or halogen donor in the laser chamber 104, or due to a high quantity of contaminate gas—the computer system 114 is configured to vent the laser chamber 104 by sending an electrical signal to the second valve 118 in order to open the second valve 118. This causes the higher pressure gases inside of the laser chamber 104 to be released to the lower pressure outside environment.

Data received from the pressure transducer 112 can be used to determine when the laser chamber 104 has been vented. For example, when the gas pressure reading obtained by using the pressure transducer 112 falls below a predetermined threshold value, the laser chamber 104 can be considered to be successfully vented.

When the computer system 114 determines that the laser chamber 104 has been vented, the computer system 114 may close the second valve 118 and then open the first gas valve 116 to resupply the laser chamber 104 with the gas needed to generate the laser beam pulsations 120 at a desired energy level.

Figure 2:
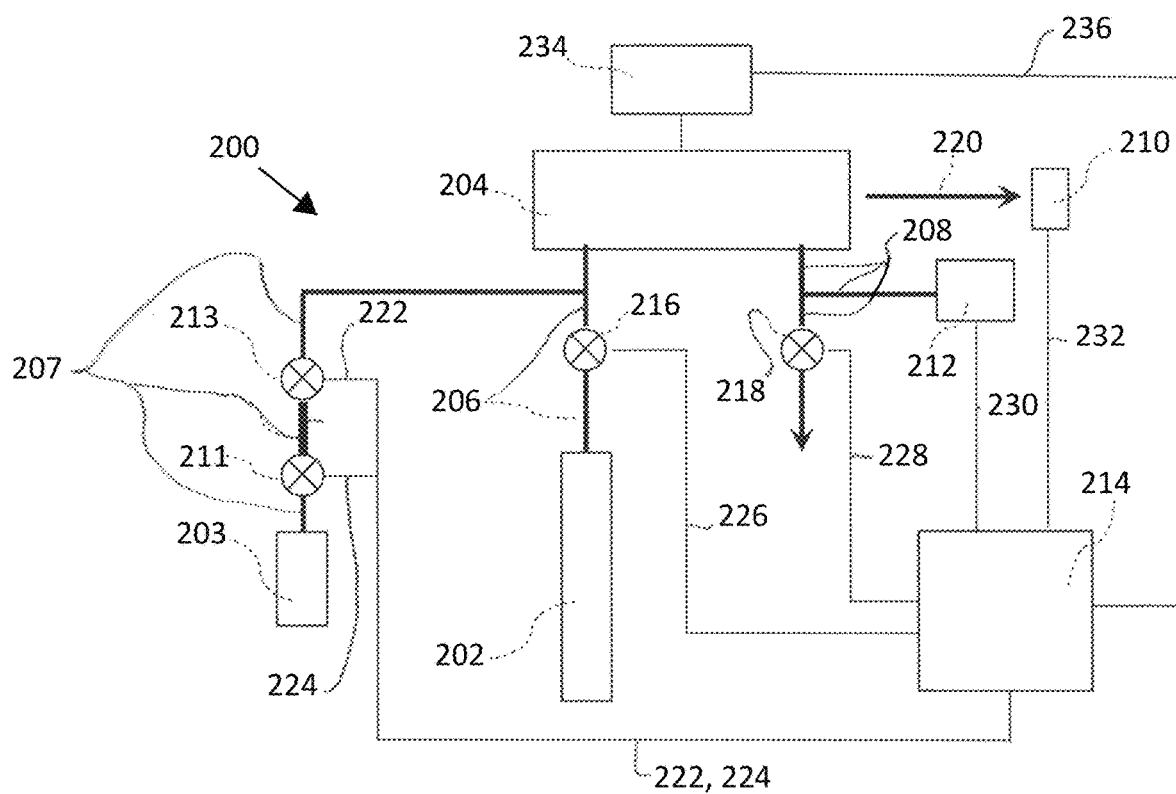
FIG. 2 is a schematic diagram illustrating a two cylinder excimer laser system according to exemplary embodiments of the present invention.

However, a conventionally sized gas cylinder 102 can be used to refill/resupply the gas chamber 104 only a few times following venting of the gas chamber 104. When the gas cylinder 102 is depleted, it must be replaced in order to allow the laser system to operate. Typically, the gas cylinder 102 must be replaced numerous times over the lifetime of the excimer laser system. The replacement process can cause disruption in the operation of the laser system. In addition, replacement of the gas cylinder 102 is an expensive process because it must be performed by a qualified technician. FIG. 2 is a schematic diagram illustrating a two cylinder excimer laser system 200 according to an exemplary embodiment of the present invention that addresses the shortcomings mentioned above. The excimer laser system 200 comprises a first gas cylinder 202, a second gas cylinder 203, a laser chamber 204, a first gas manifold 206, a second gas manifold 207, a third gas manifold 208, a laser energy detector 210, a pressure transducer 212, a computer system 214, and a high voltage pulser 234. The first gas cylinder 202 is connected to supply gas to the laser chamber 204 through the first gas manifold 206. The first gas manifold 206 may include a first valve 216 for controlling the transfer of gas from the first gas cylinder 202 to the laser chamber 204. The first valve 216 may be a solenoid valve, and may be normally closed.

The second gas cylinder 203 is also connected to supply gas to the laser chamber 204. The second gas manifold 207 provides a flow path for supplying the laser chamber 204 with gas from the second gas cylinder 203. The first and second gas manifolds 206 and 207 are shown to be connected to one another in order to supply the gas chamber 204 with gas from a single inlet opening. Alternatively, or in addition, the first and second gas manifolds 206 and 207 may be connected separately to the gas chamber 204 (i.e., through separate inlet openings).

The second gas manifold 207 includes a section 209 formed between a second valve 211 and a third valve 213. Each one of the second and third valves 211 and 213 may be a solenoid valve that is normally closed. In the illustrated embodiment, the second and third valves 211 and 213 are arranged in series along the length of the second gas manifold 207 and the interior volume of section 209 between the second and third valves 211 and 213 is known/predetermined. For example, the length of the conduit (or pipe) extending between the second and third valves 211 and 213 is known. In addition, the cross-section of the conduit extending between the second and third valves 211 and 213 is known. Therefore, the interior volume of the section 209 can be determined.

The third gas manifold 208 is in fluid communication with the laser chamber 204. The pressure transducer 212 may be connected to the third gas manifold 208 in order to measure the level of gas pressure within the laser chamber 204.

A fourth valve 218 is connected to an end portion of the third gas manifold 208. Since the gases that are contained within the laser chamber 204 are pressurized to a pressure level that is higher than ambient pressure, for example, about 45 psia, the laser chamber 204 can be vented by opening the fourth valve 218. The fourth valve 218 may be a solenoid valve that is normally closed.

The high voltage pulser 234 is connected to the laser chamber 204 for generating UV laser pulsations within the laser chamber 204. The high voltage pulser 234 may include a high voltage power supply, a capacitor bank, and a high voltage switch. The high voltage power supply has a predefined maximum voltage rating for charging the capacitor bank. The maximum voltage rating of the high voltage power supply may be, for example, 8.5 KV.

Operation of the high voltage pulser 234 generates UV laser pulsations within the laser chamber 204, which are illustrated as laser beam pulsations 220 when emitted outwardly from the laser chamber 204. The laser energy detector 210 is used to detect the intensity/energy of the laser beam pulsations 220.

The computer system 214 is electrically connected to the first, second, third and fourth valves 216, 211, 213, 218, such as through respective first, second, third, and fourth connection lines 226, 224, 222, and 228. The computer system 214 is also electrically connected to the pressure transducer 212, to the laser energy detector 210, and to the high voltage pulser 234, such as through fifth, sixth, and seventh connection lines 230, 232, and 236.

In a first embodiment, the first gas cylinder 202 may include a mixture of gases comprising a conventional (nominal) amount of halogen or halogen donor gas and other gases. For example, hydrogen chloride (HCl) gas, xenon (Xe) gas and neon (Ne) gas. In a specific example, the mixture of gases in the first gas cylinder 202 may include about 0.1% hydrogen chloride (HCl), about 0.4% xenon (Xe), and the balance neon (Ne).

The second gas cylinder 203 contains halogen or halogen donor gas at a significantly greater percentage concentration than the percentage of the concentration in the first cylinder 202. For example, the second gas cylinder 203 may include about 5% hydrogen chloride (HCl) gas, about 0.4% xenon (Xe), and the balance neon (Ne). In this example, the concentration of hydrogen chloride (HCl) gas in the second gas cylinder 203 is about 50 times higher than the concentration of hydrogen chloride (HCl) gas in the first gas cylinder 202. Other concentration ranges may also be used such as a concentration between 40 and 60 times or between 25 and 75 the concentration in the first gas cylinder.

The first gas cylinder 202 may be used to initially fill the laser chamber 204 with gas at a predetermined operational pressure or pressure range such that the pulsations of the laser beam 220 has an intensity ranging from a minimum threshold value to a predefined target value (which is greater than the minimum threshold value). As an example, the operational pressure of the laser chamber 204 can be about 45 pounds per square inch absolute (psia). As described further herein, the second gas cylinder 203 may be used to replenish the consumed halogen or halogen donor gas in the laser chamber 204.

Since the second gas cylinder 203 contains a concentrated amount of hydrogen chloride (HCl) gas, the second gas cylinder 203 can be smaller in size/capacity than the first gas cylinder 202. By keeping the second cylinder 203 small relative to the first gas cylinder 202, the second gas cylinder and related hardware as discussed herein can be retrofitted into an excimer laser system without increasing its size, or may require only a minor enlargement of the housing of the excimer laser system.

The second gas cylinder 203 can be sized and filled with a volume of gas so that its internal pressure remains greater than the desired operational pressure of the laser chamber 204. For example, the pressure inside of the second gas cylinder 203 can be designed to always be greater than 45 psia even when accounting for the drop in pressure that results from the withdrawal of gas from the second cylinder 203 during the normal operation of the excimer laser system.

The laser beam pulsations can be directed onto the laser energy detector 210. The computer system 214 is configured to monitor the energy of the laser beam pulsations 220 by using input data received from the laser energy detector 210. Energy measurements can be stored in an onboard storage memory of the computer system 220. The readings of energy of the laser pulsations 220 can be stored, for example, in non-volatile memory such as read-only memory (ROM), a hard drive, solid-state drive, etc. In addition, the computer system is configured to determine the laser efficiency of the pulsations 220. One measure of efficiency of the laser pulsations 220 is $LPE/(\frac{1}{2}*C*CV^2)$, where LPE is the laser pulse energy, C is capacitance of the capacitor bank, and CV is charge voltage.

When the laser energy of the pulsations 220 is low, for example, equal to or smaller than a predetermined threshold value, a full gas exchange can be initiated immediately by injecting gas from the first gas cylinder 202 into the laser chamber 204. When the laser energy of the pulsations 220 is greater than the predetermined threshold but the laser efficiency is trending lower (discussed further below), an injection of high concentration hydrogen chloride (HCl) gas from the second gas cylinder 203 is performed. This will be performed at a time scheduled in the future, such as after the system is powered off and then powered on a subsequent day.

The process of determining whether the energy of the laser pulsations 220 is low or whether the efficiency of the laser pulsations 220 is trending lower includes performing a periodic laser calibration. The laser calibration process can be performed, for example, as the first step of a patient treatment process. During calibration the excimer laser system is used to generate a series of laser pulsations 220. The laser pulsations 220 may be generated at a given frequency, for example, at 400 pulses per second, and may be directed toward to the laser energy detector 210. The calibration process may take about 6 to 8 second to be performed. After the calibration process, an operator of the excimer laser system can use the laser system as desired, such as to treat a patient.

Based on the energy measured by using the laser energy detector 210, the computer system 214 is configured to adjust operating settings of the high voltage pulser 234 and thereby adjust the energy of the laser pulsations 220 such that the laser pulsations 220 have a predetermined target energy value, for example, 10 mJ per pulse. The adjustment can be made in real-time by increasing or decreasing the charge voltage to the capacitor bank provided by the high voltage power supply of the high voltage pulser 234. The higher the charge voltage the higher the laser 220 pulse energy.

The voltage power supply of the high voltage pulser 234 has a maximum predefined voltage rating, for example, 8.5

KV. When the charge resulting from the maximum voltage which the power supply can provide does not yield a laser pulse energy (the energy of the laser pulsations 220) that is equal to or greater than a minimum predefine threshold energy value, for example, 7 mJ, the concentration of the hydrogen chloride (HCl) gas in the laser chamber 204 has dropped too low or the concentration of gas contaminates in the laser chamber 204 is too high, or both. In response to this condition, the computer system 214 is configured to perform a full gas exchange by flushing out the gases—and the contaminates—from the laser chamber 204, and to refill the laser chamber 204 to the proper operating internal pressure (e.g., about 45 psia) by sourcing gas from the first gas cylinder 202 (e.g., by selectively opening the first valve 216). The full gas exchange can be imitated immediately, or at least prior to the laser next being used, such as for treating the patient who is waiting to be treated during the calibration process.

During the calibration process, the energy of the laser pulsations 220 is monitored. The computer 236 can determine whether the efficiency of the laser pulsations 220 is trending lower. This can occur, for example, when the efficiency of a current laser pulsation 220 is lower than the efficiency of the preceding laser pulsation 220. In determining whether the laser efficiency of each subsequent laser pulse 220 is becoming lower (or trending downwardly), the computer system 214 can access and interpret pulsation energy readings from former laser treatment processes as well as the real-time energy pulsation readings obtained during the current calibration process.

When the computer system 214 determines that the efficiency of the laser pulsations 220 is trending downwardly, the computer system 214 is configured to perform an injection of concentrated hydrogen chloride (HCl) gas from the second gas cylinder 203. Because the excimer laser system does not need the injection immediately in order to function correctly, the injection will be scheduled at a later time, for example, at the next subsequent powering of the excimer laser system or after a predefined amount of time. For example, a minimum time between injections may be imposed such that the second cylinder 203 can provide enough make-up hydrogen chloride (HCl) to last the expected lifetime of the laser system.

The concentration of hydrogen chloride (HCl) gas in the laser chamber 204 is tied strongly to laser efficiency. Immediately after performing a full gas exchange with a correct (nominal) amount of hydrogen chloride (HCl) gas in the laser chamber 204, the laser efficiency is lower than optimum but yields acceptable pulse energy. During the first few days or week of operation, as the concentration of hydrogen chloride (HCl) gas drops in the laser chamber 204 due to the chemical reaction occurring therein, the laser efficiency actually increases to a stoichiometric optimum, then starts to decrease.

By injecting makeup hydrogen chloride (HCl) gas from the second cylinder 203 into the laser chamber 204 when the laser pulsations 220 begin to indicate a reduction in laser efficiency, the time before a full gas exchange is needed again can be extended significantly. Injections on average can be performed every two to three days over a five-year period. With the injections, the life of the first gas cylinder 202 can be extended from about 1 year to about 5 years. Since the second gas cylinder 203 contains a concentrated amount of hydrogen chloride (HCl) gas, the second gas cylinder can also last about five years or longer. In other words, with the injections of hydrogen chloride (HCl) gas from the second gas cylinder 203, both the first and second gas cylinders 202 and 203 can last the lifetime of the laser chamber 204.

In order to obtain an injection of hydrogen chloride (HCl) gas from the second gas cylinder 203 to replenish the consumed hydrogen chloride (HCl) gas in the laser chamber 204, the computer system 214 may be configured to transmit an electrical signal to the second valve 211, via the second connection line 224, in order to open the second valve 211. When the second valve 211 opens, the mixture of gases from the second gas cylinder 203 flows into a portion of the second gas manifold 207, up to the third valve 213. The mixture of gas from the second cylinder 203 does not travel beyond the third valve 213 because the third valve 213 is normally closed. Thus, the opening of the second valve 211 causes section 209 of the second gas manifold 207 to be filled with the mixture of gases from the second gas cylinder 203 at a pressure that is equal to the pressure of the second gas cylinder 203.

The computer system 214 then operates to close the second valve 211. After closing the second valve 211, section 209 of the second gas manifold 207 remains filled with the mixture of gasses from the second gas cylinder 203 at same pressure as that inside of the second gas cylinder 203. After closing the second valve 211, the computer system 214 opens the third valve 213 by transmitting an electrical signal to the valve 213 via the third connection line 222. The opening of the third valve 213 causes the pressurized mixture of gases inside of the section 209 of the second gas manifold 207 to be injected in the laser chamber 204. This is so because the pressure of the gas inside of the section 209 is higher than the operational pressure of gas in the laser chamber 204. The computer system 214 then closes the third valve 213.

A successful outcome of an injection of the make-up hydrogen chloride (HCl) is to reduce the rate of laser efficiency decline, thereby increasing the operational time before the next full gas exchange is required (for example, when the laser energy is determined to be less than the minimum predefined value (e.g., 7 mJ) during a calibration).

The pressure transducer 212 may be used to monitor the incremental pressure increase due to the injected hydrogen chloride (HCl) in the laser chamber 204.

The second gas manifold 207 can be sized (e.g., to have an internal volume size) to deliver an injection to the laser chamber 204 of a predefined volume of gas having reasonable quantity of hydrogen chloride (HCl) over a certain range of pressure of gas inside of the second gas cylinder 203. The reasonable quantity of hydrogen chloride (HCl) gas may be, for example, a reasonable fraction (5% to 30%, or preferably, 0% to 20%) of the nominal hydrogen chloride (HCl) amount in the laser chamber 204. In the first and second embodiments, as described in this specification, the nominal amount of hydrogen chloride (HCl) in the laser chamber 204 is 0.1%. In other embodiments, the nominal amount of hydrogen chloride (HCl) in the laser chamber can be different than 0.1%, for example, smaller than 0.1% or greater than 0.1%, depending on the structural configuration and operating features of the laser system. The nominal amount of hydrogen chloride (HCl) gas may also be referred to as a target value.

The internal volume size of the second gas manifold 207 can be determined with consideration of the initial amount of hydrogen chloride (HCl) gas that is stored in the second gas cylinder 203, the initial concentration of hydrogen chloride (HCl) gas that is stored in the second gas cylinder 203, the initial pressure of the mixture of gases in the second gas cylinder 203, the lowest pressure at which the second gas cylinder is configured (or desired) to operate, the volume of the second gas cylinder 203, the volume of the laser chamber 204, an optimum partial pressure of hydrogen chloride (HCl) gas in the laser chamber 204, and the desired range of incremental quantity of hydrogen chloride (HCl) gas delivered with each injection.

When the portion of the second gas manifold 207 that extends between the third valve 213 and the laser chamber 204 has a small volume (e.g., when the diameter and/or length thereof is small), the volume of section 209 of the second gas manifold 207 determines the incremental quantity of hydrogen chloride (HCl) gas delivered to the laser chamber 204. The volume of section 209 can be designed so that section 209 can be used to inject a metered quantity of hydrogen chloride (HCl) gas in the laser chamber 204 and when the quantity of hydrogen chloride (HCl) gas that is delivered to the laser chamber 204 is a reasonable fraction of the nominal amount of hydrogen chloride (HCl) gas in the laser chamber 204.

For example, when the interior volume of section 209 (i.e., the volume between the second and third valves 211 and 213) is 0.02% of the interior volume of the laser chamber 204, and the initial pressure of the second gas cylinder 203 is 400 psia with 5% of the gas therein being hydrogen chloride (HCl), a single injection of hydrogen chloride (HCl) gas will increase the partial pressure of hydrogen chloride (HCl) gas in the laser chamber 204 by about 0.004 psia.

The nominal partial pressure of hydrogen chloride (HCl) gas in the laser chamber 204 is about 0.045 psia. Therefore, the injection represents 8.9% of the nominal amount.

As the gas in the second cylinder 203 is consumed, the pressure inside of the second cylinder will drop. When the pressure of gas inside of the second gas cylinder 203 drops to, for example, 100 psia, at 100 psia a single injection of gas from the second cylinder 203 will provide about 2.2% of the nominal amount of hydrogen chloride (HCl) gas in the gas chamber 204 (assuming that section 209 is 0.02% of the volume of the laser chamber 204). In this case, two or more consecutive injections may be performed to achieve a reasonable amount (5% to 20%) of make-up hydrogen chloride (HCl).

Therefore, by appropriate selection of the above design parameters, the halogen makeup gas can be sourced primarily from the second cylinder 203. This reduces the frequency of gas exchanges from the first cylinder 203. Since the total amount of hydrogen chloride (HCl) gas contained in the second cylinder 203 can be sufficient for makeup injections lasting the full operational life of the laser chamber 204 (due to the high concentration thereof in the second gas cylinder 203), the excimer laser system of the present invention can last a lifetime of the laser chamber 204 without the need to replace any gas cylinder, and without the down time that may result while waiting for the exchange of a cylinder to occur. This is advantageous, especially when considering that the excimer laser system of FIG. 1 needs a replacement of the first gas cylinder 201 about once a year.

To reduce or eliminate the need for gas cylinder maintenance over the entire lifetime of the laser chamber 204, the laser chamber 203 must be refilled mainly with injections from the second gas cylinder 203. Full gas exchanges from the first cylinder 202 need be less frequent than injections from the second gas cylinder 203, occurring, for example only after a full purge is needed.

In a typical operating environment, the excimer laser system of the present invention can be configured to operate for a five year period without needing replacement of any of the first and second gas cylinders 202 and 203. Over this time, out of six times which the laser chamber 204 would need to be supplied with fresh gas from the first and second cylinders 202 and 203, the second gas cylinder 203 supplies the gas chamber 204 at least five times with hydrogen chloride (HCl) injections and the first gas cylinder 201 one time or less with a full gas exchange. In contrast, in the single cylinder system of FIG. 1 there would need to be six full gas exchanges done using the first cylinder 102. The present invention replaces at least five of those full gas exchanges with injections from the second cylinder 203.

For full gas exchanges to be sufficiently infrequent, the rate of contamination buildup in the laser chamber 204 must be slow enough so as not to reduce laser energy below the minimum during the extended time span between full gas exchanges. U.S. Pat. No. 4,891,818 teaches how to construct a laser chamber which meets the criteria for low contaminate buildup. The teachings of U.S. Pat. No. 4,891,818 are incorporated by reference herein, and may be used for constructing the laser chamber 204.

Figure 3:
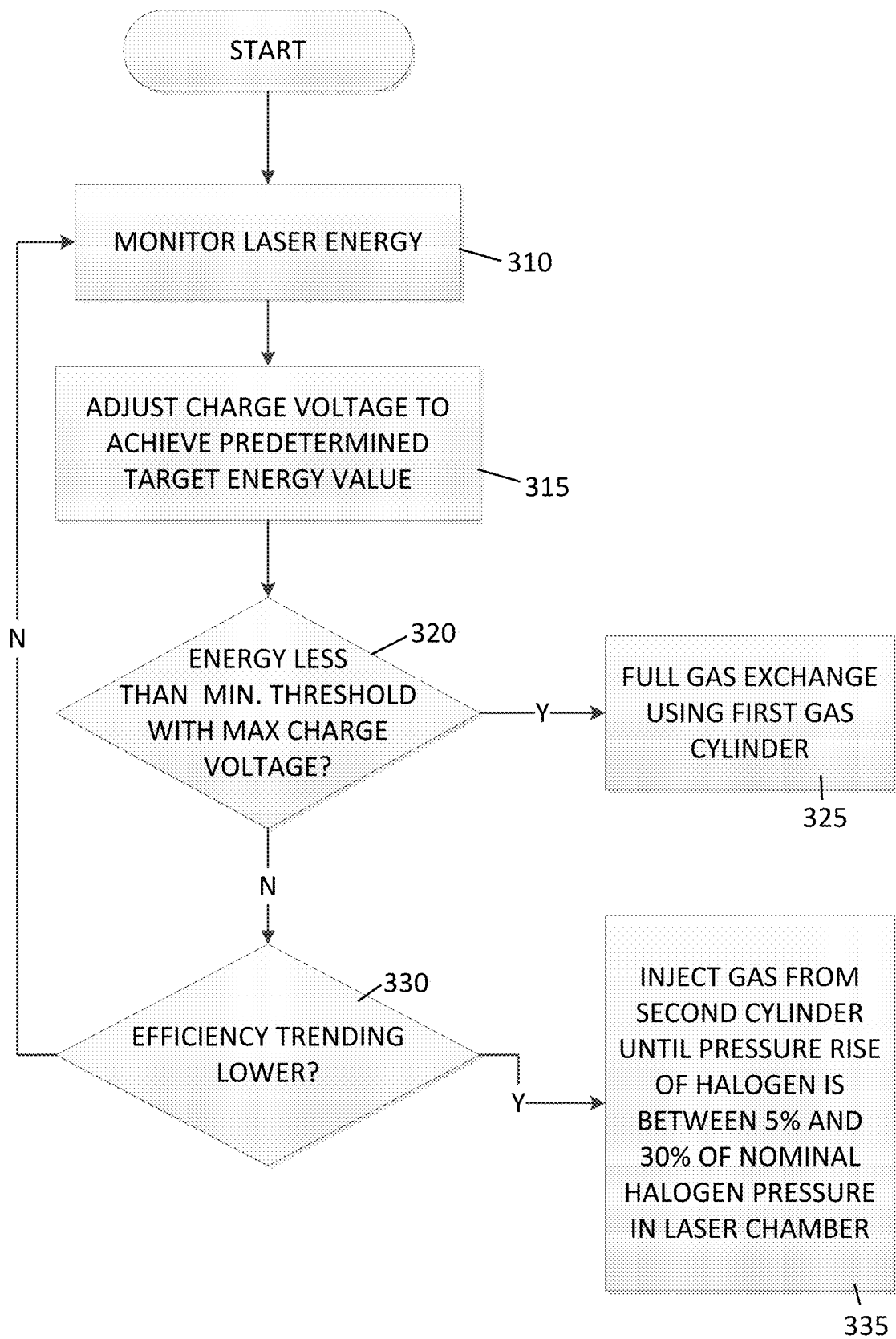
FIG. 3 is a summary flowchart of the control computer operation according to a first embodiment.

FIG. 3 is a summary flowchart of the operation of the computer system 236 with an excimer laser system 200 having first and second gas cylinders filled as discussed herein for the first embodiment. The laser energy is monitored (Step 310) and the power supply charge voltage settings are adjusted to achieve a predetermined target energy value (step 315). If the maximum power supply voltage is reached and the energy threshold has not been met (step 320), a purge and full gas exchange using gas from the first cylinder is performed (step 325). If the energy threshold has been reached (step 320) but laser efficiency is trending lower (step 330), one or more gas injections are performed using gas from the second cylinder until the pressure transducer indicates a reasonable amount (5% to 20% of the nominal amount) of make-up hydrogen chloride (HCl). (step 335).

In a second embodiment of the present invention, an excimer laser system has the same structural layout as that shown in FIG. 2 but the content of gas in the first and second cylinders 202 and 203 is different from that of the excimer laser system described with reference to the first embodiment, and the computer system 236 operates somewhat differently as well.

In the second embodiment, the first gas cylinder 202 includes only inert gases. For example, the first gas cylinder 202 may contain xenon (Xe) and neon (Ne), but no halogen gas. The ratio of xenon (Xe) to neon (Ne) in the first gas cylinder 202 can be the same as that of xenon (Xe) to neon (Ne) in the gas cylinder 202 described with the first embodiment. For example, the composition of gas in the first gas cylinder 202 may be about 0.4% xenon (Xe), the balance neon (Ne). The composition of gas in the second cylinder 203 may be exactly the same as that of the gas cylinder 203 in the first embodiment.

In this second embodiment, a full gas exchange involves mixing the inert gases from the first cylinder 202 with small amounts of gas from the halogen-rich second cylinder 203 to generate the correct (or target) gas mixture ratio in the laser chamber 204. The correct/target gas mixture ratio in the laser chamber 204 may be, for example, 0.1% hydrogen chloride (HCl), 0.4% xenon (Xe), the balance neon (Ne).

The full gas exchange may be initiated in response to a determination that laser energy of the pulsations 220 is low, for example, equal to or smaller than a predetermined threshold value. As noted above, the predetermined threshold value can be, for example, about 7 mJ. In response to the lower-than-threshold-value energy of the laser pulsations 220, the computer system 214 may be configured to vent the laser chamber 204—from the normal operational pressure of about 45 psia to slightly above atmospheric pressure (about 15 psia)—by selectively opening the fourth valve 218A.

The gas mixture from the first cylinder 202 is then used to purge through the laser chamber 204 for a short period of time (e.g., one minute) to flush out gas-phase contaminates by briefly opening both fourth and third valves 218 and 216 simultaneously. Then the concentrated hydrogen chloride (HCl) gas is added to the laser chamber 204 in a series of injections from the second cylinder 203A to the optimum amount as measured by the pressure transducer 212. Next the mixture of xenon (Xe) and neon (Ne) gases are added to the laser chamber 204 from the first cylinder 202 until the laser chamber 204A pressure increases to the nominal operating value (e.g., about 45 psia). The pressure transducer 212A provides feedback to the computer system 214A to control the venting, purging, and filling operations of the laser chamber 204A.

The determination of whether the laser chamber 204A needs an injection of hydrogen chloride (HCl) gas can be performed as described above for the excimer laser system of the first embodiment. In addition, the process of injecting gas from the second gas cylinder 203A into the laser chamber 204A can be performed as described above. The decision on whether to perform a full gas exchange or an injection of concentrated hydrogen chloride (HCl) gas from the second gas cylinder 203 can also be the same as that of the embodiment of FIG. 2 described above. In addition, in this embodiment, the process of injecting concentrated hydrogen chloride (HCl) gas into the laser chamber 204A from the second gas cylinder 203A may be the same as that described above. The excimer laser system of the second embodiment can also last the entire lifetime of the laser chamber 204 without needing replacement of any of the two gas cylinders 202 and 203.

Figure 4:
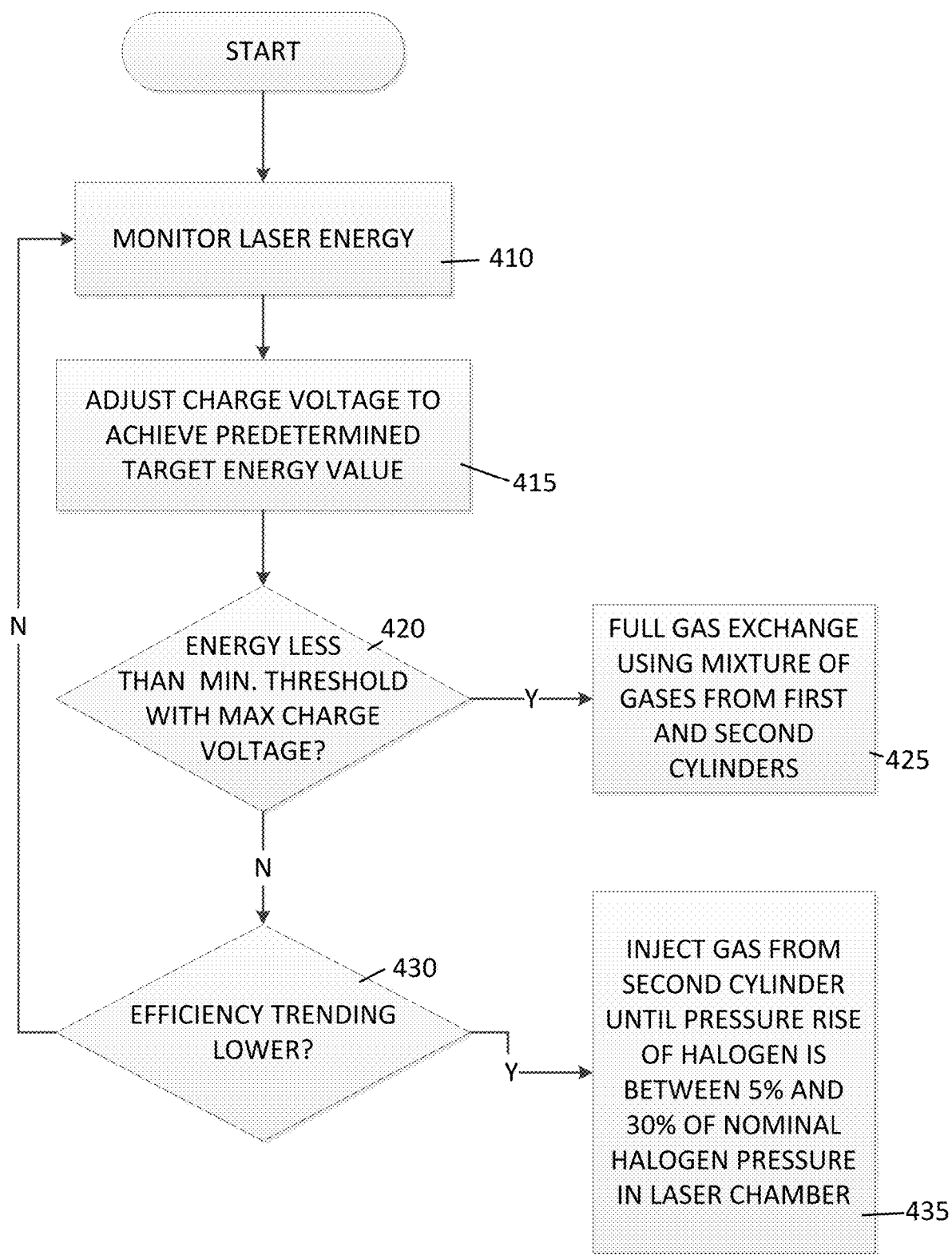
FIG. 4 is a summary flowchart of the control computer operation according to a second embodiment.

FIG. 4 is a summary flowchart of the operation of the computer system 236 with an excimer system 200 having first and second gas cylinders filled as discussed herein for the second embodiment. The laser energy is monitored (Step 410) and the power supply voltage settings are adjusted to achieve a predetermined target energy value (step 415). If the maximum charge voltage is reached and the energy threshold has not been met (step 420), a purge and full gas exchange using gas from the first and second cylinders is performed (step 425). If the energy threshold has been reached (step 420) but laser efficiency is trending lower (step 430), one or more gas injections are performed using gas from the second cylinder until the pressure transducer indicates a reasonable amount (5% to 20%) of make-up hydrogen chloride (HCl). (step 435).

Accordingly, a laser system of the present invention can be made to last the entire lifetime of the laser chamber with the mere addition of a small gas cylinder. The benefits derived from operating the excimer laser system without interruptions in work and without service calls to replace any gas cylinder during the entire lifetime of the gas chamber outweigh the small added cost for the second gas cylinder and associated manifold and valve hardware.

The computer system can be a general purpose computer having a microprocessor and various I/O ports or a microcontroller with many of the system components formed therein, or other conventional system that can receive and process input data and output signals to control the attached valves and exciter units. The computer system operates in response to computer software stored therein in a fixed ROM, a solid state long term memory, or other conventional data storage systems. The computer memory can also be used to store operating data, system settings, collected power and efficiency data, and other information used operating the laser system. Various suitable computer systems and software types will be known to those of ordinary skill in the art.

While the present invention has been particularly shown and described with reference to exemplary embodiments thereof, it will be apparent to those of ordinary skill in the art that various changes in form and detail may be made therein without departing from the spirit and scope of the present invention.

What is claimed is:

1. An excimer laser system, comprising:
    a laser having a chamber and being configured to emit a pulsed laser beam when operated;
    a first gas cylinder configured to store a first pressurized gas therein;
    a second gas cylinder configured to store a second pressurized gas therein;
    a first gas manifold connecting the first gas cylinder and the laser chamber to one another, the first gas manifold including a first valve for selectively controlling a flow of gas from the first gas cylinder to the laser chamber;
    a second gas manifold connecting the second gas cylinder and the laser chamber to one another, the second gas manifold including a second valve for selectively controlling a flow of gas from the second gas cylinder to the laser chamber;
    a third gas manifold connected to the laser chamber and including a third valve for selectively flushing out gas from the laser chamber;
    a laser energy detector configured to measure an energy of the pulsed laser beam; and
    a computer system electrically connected to control the first, second, and third valves and to receive as input energy signals from the laser energy detector,
    wherein the computer system includes software that, when executed, causes the computer system to:
    (a) receive energy readings from the laser energy detector and calculate laser operating efficiency based on the received energy readings;
    (b) detect a first operating condition indicating that the laser chamber needs to be flushed out and refilled with gas and, in response selectively control the third valve to at least partially flush out gas from the laser chamber and then selectively control the first valve to transfer gas from the first cylinder into the laser chamber; and
    (c) detect a second operating condition indicating that the laser chamber needs an injection of halogen or halogen donor gas and, in response selectively control the second valve to inject a metered quantity of halogen or halogen donor gas into the laser chamber,
    wherein the first gas cylinder contains a halogen or halogen donor gas at a first concentration and the second gas cylinder contains the halogen or halogen donor at a second concentration greater than the first concentration.

2. The excimer laser system of claim 1, wherein the metered quantity of halogen or halogen donor gas ranges from 5% to 30% of a target amount of hydrogen chloride (HCl) gas in the laser chamber.

3. The excimer laser system of claim 1, wherein the second gas manifold includes a fourth valve separated from the second valve, wherein a portion of an interior volume of the second gas manifold located between the second and fourth gas valves has a predefined volume used for metering the quantity of halogen or halogen donor gas that is injected into the laser chamber.

4. The excimer laser system of claim 3, wherein the computer system is configured to sequentially open and close the second and fourth valves a plurality of times in order to inject the metered quantity of halogen or halogen donor gas into the laser chamber a plurality of times.

5. The excimer laser system of claim 1, further comprising a high voltage pulser connected to the computer system, the high voltage pulser comprising a capacitor bank and a high voltage power supply for charging the capacitor bank, wherein the software, when executed, causes the computer system to selectively adjust the energy of the pulsed laser beam by adjusting an operating setting of the high voltage pulser.

6. The excimer laser system of claim 5, wherein the first operating condition exists when the capacitor bank is charged at a maximum voltage which the power supply can provide and the energy of the pulsed laser beam is smaller than a predetermined threshold energy.

7. The excimer laser system of claim 5, wherein the second operating condition exists when the energy of the pulsed laser beam is equal to or greater than a predefined energy threshold but the operating efficiency at a first time is greater than the operating efficiency at a second time preceding the first time.

8. The excimer laser system of claim 1, wherein the second gas cylinder is smaller than the first gas cylinder.

9. The excimer laser system of claim 1, wherein the second gas cylinder has gas therein at a pressure greater than an operational pressure of the laser chamber.

10. The excimer laser system of claim 1, wherein both the first and second gas cylinders contain an inert gas and an inert buffer gas.

11. The laser system of claim 10, wherein the inert gas is xenon (Xe) gas and the inert buffer gas is neon (Ne) gas.

12. The laser system of claim 1, wherein the halogen or halogen donor gas is hydrogen chloride (HCl).

13. The laser system of claim 1, wherein the second concentration is between 25 and 75 times the first concentration.

14. The excimer laser system of claim 1, wherein the first concentration is about 0.1% and the second concentration is about 5%.

15. The excimer laser system of claim 1, wherein the second gas cylinder contains a halogen or halogen donor gas and the first gas cylinder is free of the halogen or halogen gas.

16. The excimer laser system of claim 14, wherein the software further causes the computer system to, in response to the detection of the first operating condition and after flushing out gas from the laser chamber, selectively control the second valve to transfer gas from the second cylinder into the laser chamber.

17. A method of operating an excimer laser system comprising the steps of:
providing an excimer laser system having a laser chamber, a high voltage pulser connected to a laser chamber and having a maximum voltage rating;
measuring an energy level of laser pulses emitted from the laser chamber and an operating efficiency of the laser system;
in response to determination that the energy level is less than a predefined threshold when the pulser is operating at the maximum voltage, flushing gas from the laser chamber and then filling the laser chamber with gas from a first gas cylinder containing a pressurized first gas therein including a halogen or halogen donor gas at a first concentration; and
in response to a determination of dropping efficiency when the energy level is not less than the predefined threshold, injecting a metered quantity of gas from a second cylinder into the laser chamber, the second cylinder containing a pressurized second gas therein including the halogen or halogen donor gas at a second concentration that is greater than the first concentration, a pressure of the second cylinder being greater than an operating pressure of the laser chamber.

18. The method of claim 17, wherein the metered quantity of halogen or halogen donor gas ranges from 5% to 30% of a target amount of hydrogen chloride (HCl) gas in the laser chamber.

19. The method of claim 17, wherein the second concentration is between 27 and 75 times the first concentration.

20. The method of claim 17, wherein the first concentration is about 0.1% and the second concentration is about 5%.

21. The method of claim 17, wherein the halogen or halogen donor is HCl.

22. The method of claim 17, wherein the first gas further comprises an inert gas and an inert buffer gas and the second gas further comprises the inert gas and the inert buffer gas.

23. The method of claim 22, wherein the inert gas is xenon and the inert buffer gas is neon.

\* \* \* \* \*